No. 849,199. PATENTED APR. 2, 1907.
R. H. BOWEN.
WHEEL.
APPLICATION FILED JULY 17, 1905.
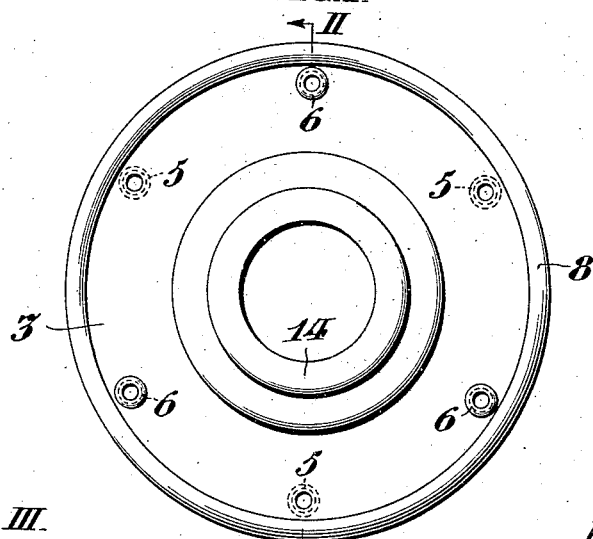
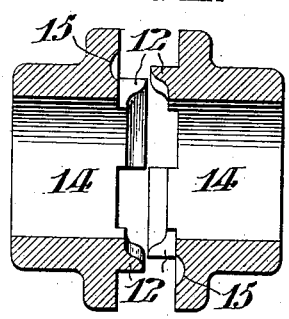
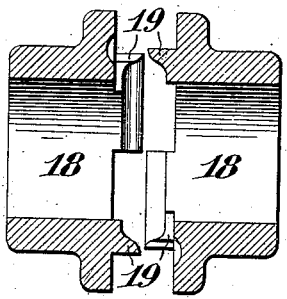
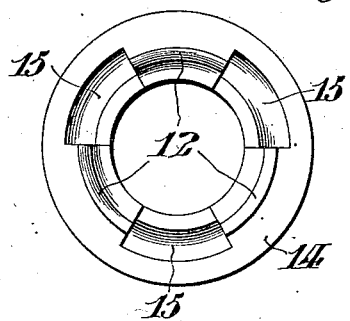
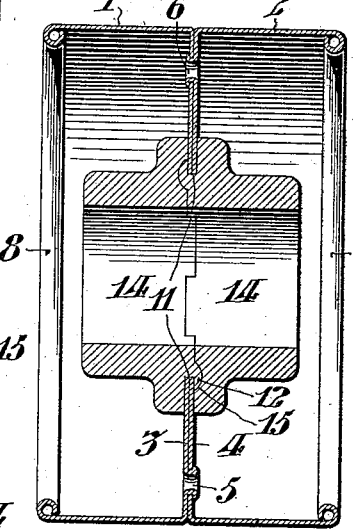
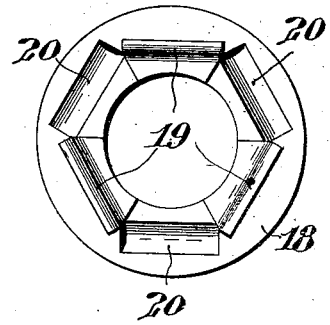
WITNESSES:
Clifton C. Hallowell
John C. Bergner.
INVENTOR:
RUSSELL H. BOWEN,
by Paige, Paul & Foley,
Attys.

UNITED STATES PATENT OFFICE.

RUSSELL H. BOWEN, OF PALMYRA, NEW JERSEY, ASSIGNOR TO THE AMERICAN PULLEY COMPANY, OF PHILADELPHIA, PENNSYLVANIA, A CORPORATION OF PENNSYLVANIA.

WHEEL.

No. 849,199.  Specification of Letters Patent.  Patented April 2, 1907.

Application filed July 17, 1905. Serial No. 269,915.

*To all whom it may concern:*

Be it known that I, RUSSELL H. BOWEN, of Palmyra, in the county of Burlington and State of New Jersey, have invented certain new and useful Improvements in Wheels, whereof the following is a specification, reference being had to the accompanying drawings.

My improvements may be advantageously employed in pulleys constructed of pressed sheet metal, as my invention provides a hub which may be permanently secured in such a wheel without separate attaching means.

As hereinafter described, my invention comprises a hub comprising complementary and primarily separate sections respectively provided with complementary projections and recesses, which when the hub is pressed through an opening in the web of a pulley, which connects the pulley-hub and rim, interlock in permanent engagement therewith. As described, said projections and recesses may be arranged in a circular series to interlock through a circular opening in a web or they may be arranged in a polygonal series to interlock through a polygonal opening.

My invention comprises the various novel features of construction and arrangement hereinafter more definitely specified.

In the drawings, Figure I is a side elevation of a pulley conveniently embodying my improvements. Fig. II is a sectional view of said pulley, taken on the line II II in Fig. I. Fig. III is a sectional view of the complementary hub-sections shown in Fig. II, but in their initial form. Fig. IV is an inner face view of the hub-section shown at the right-hand side of Fig. III. Fig. V is a sectional view similar to Fig. III, but showing a modified form of my invention. Fig. VI is an inner face view of the hub-section shown at the right-hand side of Fig. V.

In said figures the pulley-rim comprises two axially-alined cylindrical sections 1 and 2, respectively, in unitary relation with annular plane webs 3 and 4, secured together by tubular riveted projections 5 and 6, which latter are in unitary relation with the respective webs 3 and 4, as shown in Fig. II, and disposed in alternation in a circular series, as indicated in Fig. I. Said rim-sections 1 and 2 are conveniently reinforced at their opposite edges by the tubular flanges 8 and 9, which may be hollow, as indicated in Fig. II, or be filled with a reinforcing-bar.

In the form of my invention shown in Figs. I and II the webs 3 and 4 are provided with a circular central opening 11 of the same diameter as the projections 12 on the complementary hub-sections 14 in their initial form. (Shown in Figs. III and IV.) Said two hub-sections 14 are precisely alike and comprise recesses 15 between the adjoining projections 12, which are disposed in a circular series. The two sections 14 being opposed with the projections 12 of one section in registry with the recesses 15 of the other section, as indicated in Fig. III, may be pressed through said central opening 11 in the webs 3 and 4 axially toward each other, so as to deform the projections 12 in the recesses 15 and cause them to interlock in permanent engagement with the webs 3 and 4, as shown in Fig. II, said projections 12 being alternately turned in engagement with the opposite faces of said webs.

In the form of my invention above described the perimeter of the opening 11 in the webs 3 and 4 and of the projections 12 being circular, relative rotation of the hub and webs 3 and 4 is prevented solely by their frictional engagement. However, it is to be understood that said interlocking projections may be disposed in polygonal relation, so as to positively prevent such relative rotation. For instance, in Figs. V and VI, I have shown complementary hub-sections 18, having projections 19 arranged in a hexagonal series with intermediate corresponding recesses 20. It is to be understood that such a hub may be immovably secured in a web having a hexagonal opening which embraces said projections 19.

I do not desire to limit myself to the precise details of construction and arrangement herein set forth, as it is obvious that various modifications may be made therein without departing from the essential features of my invention. For instance, although I have shown each of the hub-sections provided with three projections it is to be understood that other numbers of projections may be employed, and although I have shown said projections arranged in circular and hexagonal series it is to be understood that they may be otherwise arranged.

I claim—

1. In a wheel, the combination with a web; of a hub comprising axially-alined sections having projections extending through an opening in said web and respectively engaged with the opposite faces thereof, substantially as set forth.

2. In a wheel, the combination with a web, comprising opposed annular flanges carrying a rim; of a hub comprising axially-alined complementary sections having projections extending through said web and embracing the respectively opposite sides thereof, substantially as set forth.

3. In a wheel the combination with a web, of a hub comprising complementary sections respectively provided with axial bearings and having complementary interlocking projections and recesses whereby said sections are inseparably connected, substantially as set forth.

4. In a wheel, the combination with a web, of a hub comprising complementary sections respectively provided with axial bearings and having complementary interlocking projections and recesses circumferentially disposed in alternation in the respective hub-sections, whereby said sections are inseparably connected, substantially as set forth.

In witness whereof I have hereunto signed my name, at Philadelphia, in the State of Pennsylvania, this 13th day of July, 1905.

RUSSELL H. BOWEN.

Witnesses:
   ALBERT W. MORRIS,
   JOSEPH ENTWISLE.